United States Patent

[11] 3,604,102

| [72] | Inventors | Mario Boccalari<br>Saluggia, Vercelli, Italy;<br>Gianfranco Colombi, Rome, Italy; Mario Gabaglio, Turin, Italy; Aldo Liscia, Turin, Italy; John M. Siergiej, Wayland, Mass. |
|---|---|---|
| [21] | Appl. No. | 786,669 |
| [22] | Filed | Dec. 24, 1968 |
| [45] | Patented | Sept. 14, 1971 |
| [73] | Assignee | Comitato Nazionale Per L'Energia Nucleare<br>Rome, Italy |
| [32] | Priority | Oct. 15, 1968 |
| [33] | | Italy |
| [31] | | 827,962/68 |

[54] PROCESS FOR EFFECTING METALLURGICAL JOINTS BETWEEN TWO DIFFERENT METALS AND THE PRODUCTS OBTAINED THEREBY
14 Claims, 12 Drawing Figs.

[52] U.S. Cl...................................... 29/474.3,
29/479, 29/480, 29/481
[51] Int. Cl........................................ B21d 31/04
[50] Field of Search............................ 29/474.3,
480, 481, 478, 479, 475, 473.3

[56] References Cited
UNITED STATES PATENTS

| 1,776,855 | 9/1930 | Holmes .................... | 29/480 |
| 2,986,273 | 5/1961 | Bardgett.................... | 29/480 |
| 3,040,427 | 6/1962 | Howell ...................... | 29/481 X |
| 3,042,428 | 7/1962 | Gardiner .................... | 29/480 X |
| 3,101,531 | 8/1963 | Roseberry .................. | 29/481 X |
| 3,160,951 | 12/1964 | Markert, Jr. et al. ........ | 29/474.3 |
| 3,449,821 | 6/1969 | Vansteenkiste ............ | 29/474.3 |
| 3,481,024 | 12/1969 | Bunn......................... | 29/474.3X |
| 3,397,445 | 8/1968 | Ulmer et al. ............... | 29/479 X |

*Primary Examiner*—John F. Campbell
*Assistant Examiner*—Richard Bernard Lazarus
*Attorney*—Richards and Geier

ABSTRACT: A method of producing tubular joints by a metallurgical bond wherein two tubular masses of different metals are placed one within the other; their facing surfaces are machined to facilitate the bond and then the bond is carried out by extrusion. The composite extruded tube is subjected to a forming operation, and is then machined and finished.

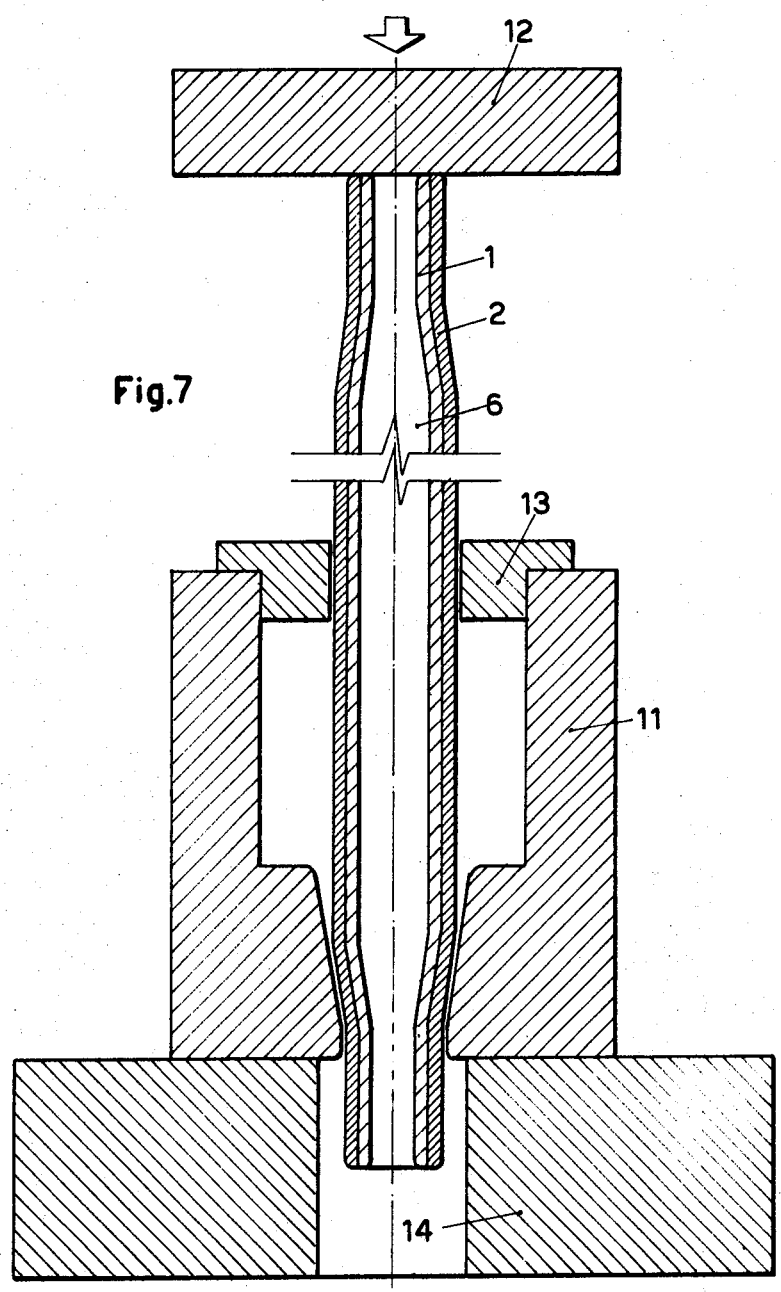

Fig. 10
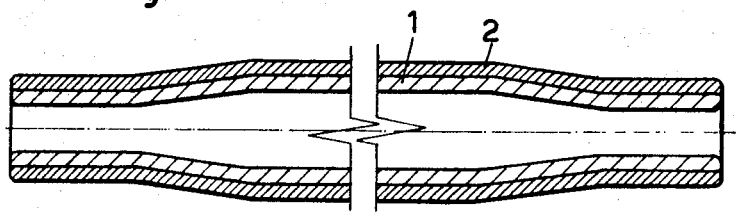
Fig. 11
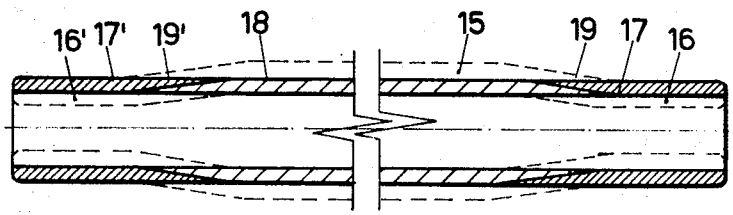
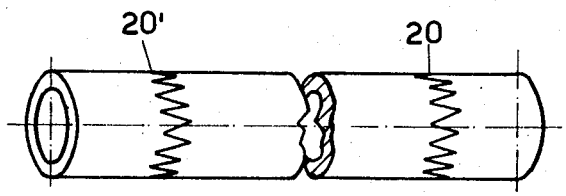
Fig. 12

PROCESS FOR EFFECTING METALLURGICAL JOINTS BETWEEN TWO DIFFERENT METALS AND THE PRODUCTS OBTAINED THEREBY

An object of this invention is the production of joints through a technological process which permits the bonding of two different metals. More particularly, an object of this invention is to provide simple or multiple tubular connections, generally called transition joints; through the union of two or more tubular elements each made of a metal which shows affinity toward the metal of the adjoining element in a way to permit the developing of a metallurgical bond between them.

Two metals which in their pure state, or alloyed, show a metallurgical affinity between them are, for instance, zirconium and iron or their alloys. Transition joints between these two metals, made by the method described herein, are especially useful in some special applications.

In the nuclear technology, particularly, such joints have remarkable advantages since use of the expensive zirconium alloy can be restricted within the fuel portion of the reactor to take advantages of zirconium's low neutron absorption characteristics. The zirconium portions can be connected, by said transition joints, to less expensive stainless steel components employed in areas of the reactor where neutron economy is not the primary consideration.

For example, the combined use of zirconium tubes and of stainless steel header plates has been actually realized as the ideal solution for making heat exchangers in nuclear reactors. The need therefore arises of effecting the positive connection between the stainless steel plates and the tubes made of zirconium or its alloys. Such a connection must be made in a way to meet the requirement of a perfect sealing against leakage of the circulating coolant. Such condition must be satisfied, when mechanical stresses are simultaneously present due to induced vibrations, to the turbulent flow of the coolant, and to the thermal stresses caused by sudden temperature changes. In fact, any accidental leakage of even small amounts of coolant from the pressurized tubes of the heat exchanger would be a serious defect due to accidental contamination by escaping fission products.

It is to be noted that an ordinary joint between zirconium and stainless steel, when such a joint is achieved with methods causing the melting of the two metals, does not achieve satisfactory results because it produces large volumes of intermetallic compounds that, by their nature, are fragile and therefore impair the mechanical strength and resistance to corrosion of the joint.

If, however, a suitable joint can be processed by a method where no melting occurs so that an ultrathin metallurgical bond of a nonbrittle type will exist between the zirconium and steel, then the steel components of the joint can be welded to the steel plate by conventional means, and the zirconium component can be welded to the zirconium tube also by conventional established practice.

Joining processes are therefore used which allow the joining of two or more different metals at bonding temperatures not higher than those at which liquid phases are formed. Techniques used include explosive forming, forging, swagging, pressure bonding, and extrusion. These techniques can all be applied at temperatures which are high enough for obtaining a pronounced plasticity of the material to be bonded but which are in any case lower than the temperatures at which liquid phases are formed. Among these processes, the extrusion technique has proved to be particularly promising.

It is known that in the field of extrusion, such methods have been developed and tried which permit metallurgical bonding of zirconium with other metals. One of the developed methods effects the metallurgical junction of zirconium with other metals by means of the extrusion of a billet composed of adjoining elements placed in tandem and comprising an outer can of copper or iron which can be evacuated (see TID Report Nr. 7546 p. 157–181 Paris Conference 18–23 Nov. 1957).

The joint so obtained usually shows good characteristics of metallurgical bond; however, in general, it can exhibit poor characteristics of form, uneven positioning of joints, and nonuniformity, especially in the case when tubular joints are to be produced.

In particular, a tandem method is not always successful when two joints are to be made at the ends of a long tube, or when several joints are to be made at different locations along the same tube.

The method which is the object of the present invention differs from the tandem extrusion, and consists in obtaining the joint through the following three separate process steps:

a. An evacuated billet comprising two or more tubular coaxial components is extruded in a way to obtain a coaxial tubular coextrusion which preserves the axial symmetry characteristics of the initial billet (that is, the components of the billet are not in tandem) and are extruded together in a single operation.

b. The tubular extrusion is then subjected to a gradual plastic deformation, axially and radially symmetrical, at the section of the tube where the intended joint is to be effected; thus operation may imply an increase or a decrease of the tube diameter and may be made at one or both ends of the tube or at any position along the tube and in general is dictated by the thickness of various coaxial components of the extruded billet.

c. The coextrusion formed as per the preceding step is machined and finished so as to bring it to the required final inner and outer diametral dimensions by partially or totally removing the material of one or more components of the initial billet and thereby isolating the transition joint.

It can be understood that the same process is to be adapted to other bonded forms than circular tubes such as flat plates, square or rectangular tubes or of various other cross sections. For the sake of clarity the following detailed description will deal only with the production of circular joints, the necessary adaptation of this process to the other mentioned shapes being considered obvious.

The main object of this invention is to provide a new process for making improved single or multiple tubular joints between two metallic components of different nature, which joints combine the characteristics of a good metallurgical bond with more positive reproducibility, improved reliability, and resultant lower cost.

A second object of this invention is to provide means for creating a very large contact surface and mechanical interlock between the two metals to be joined; this being accomplished by prior machining of the surface of the harder of the two adjoining components of the billet with sharp grooves, indentations and the like. By the use of said grooves a metallurgical bond of better quality between the two metals to be joined is also obtained, as will be explained below.

Another feature of this invention is to allow exact positioning of the joint. This feature will permit the manufacture of tubes with joints at both ends, with the distance from one another exactly reproducible in a series of tubes, and it will also be possible to increase the number of joints obtainable per extrusion if individual short joints are desired.

Another feature is to provide a joint perfectly symmetrical during the extrusion operation with respect to all planes containing the longitudinal axis of the tube and to all planes perpendicular to said axis. This feature results in a smooth pressure curve during extrusion owing to the constant composition of the cross section at any given instant during the said extrusion operation.

A further feature of the present invention is to permit the preselection and the exactly programming of the desired inclination of the bonded surfaces with respect to the tube axis. This feature is in sharp contrast to the variations which usually occur in the prior extrusion techniques employed heretofore.

A further feature of the invention is to permit the production of a plurality of joints along the same tubular extrusion, these joints having the same technological characteristics, thus facilitating mass production and quality control. For example, testing of the bond quality can be advantageously verified through destructive tests on samples taken immediately adjacent to the joint section; this is not possible with other extrusion processes for joints.

Other features and consequent advantages of this invention will become apparent from the following detailed description with reference to the attached drawings:

FIGS. 5 and 7 illustrate the operation of forming a joint at its proper position at one or both ends, respectively, of the extruded tube of FIG. 3.

FIGS. 6, 8, 9, 10, 11 illustrate the step of machining a formed tube into a single or double joint.

FIG. 12 shows a typical zigzagged line of junction on the outer surface of a double jointed tube.

With reference to the above FIGS., single or multiple joints (for instance between zirconium or a zirconium alloy and a stainless steel) are obtained through the following three process steps; extrusion, forming, and machining.

Figure 1:
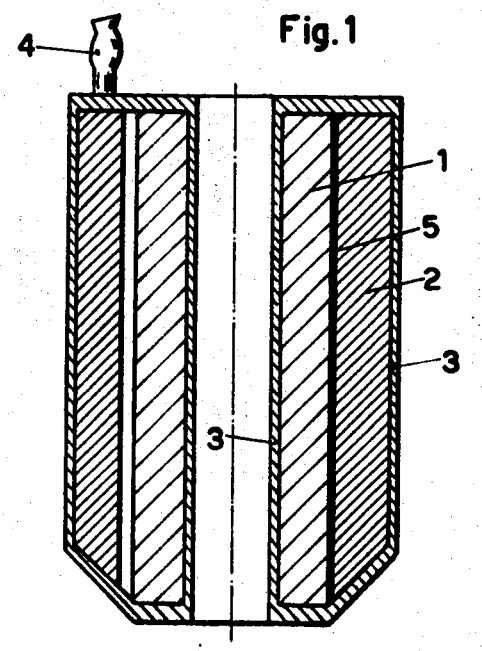
FIG. 1 illustrates a longitudinal section of a billet comprising two tubular components encased in an outer jacket.

In the extrusion step, with reference to FIG. 1, a billet is prepared, for instance, composed of two tubular coaxial components 1 and 2, the lengths of which are generally similar and the diameters are such that one component can be introduced into the other; one component being made of a metal which is metallurgically compatible with the other; and the characteristics of the two components with respect to the extrusion operation being somewhat comparable; in particular, the outer component 2 being, for instance, made of stainless steel while the inner one 1 being for instance made of zirconium. The billet is assembled inside a case 3 of a toroidal shape made of a continuous layer of malleable metal forming a perfect high vacuum tight seal all around the assembled components of the billet, the vacuum being obtained through pipe 4 prior to its being sealed.

Figure 2:
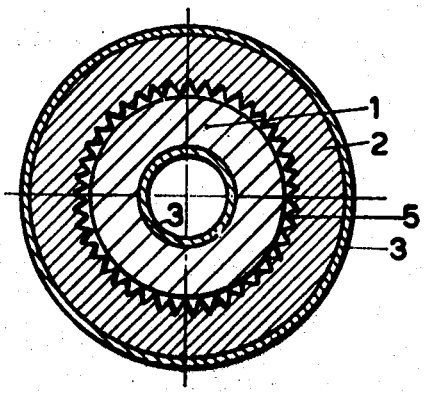
FIG. 2 shows a transverse cross section of the billet of FIG. 1.

With reference to FIG. 2, showing a cross section of the said billet the use of longitudinal grooves 5 with sharp ridges, or of similar means, adopted for increasing the bonded surface area and providing a mechanical interlock, is an added feature for obtaining a higher quality bond. In fact, in the particular case when longitudinal grooves or similar means are provided on the harder metal only, during the initial portion of the extrusion operation, the ridges 5 cut into the softer metal and instantly give rise to a fresh area of contact free from surface contaminations which otherwise would be a major reason for defective or failed bonds.

The use of means such as the above-mentioned ridges has the advantage of a wider choice of the extrusion reduction ratio i.e. the ratio between the cross-sectional areas of the billet to the extruded tube. This advantage occurs because the grooves "stretch out" the original surface of the zirconium and thus break the contamination layer in the same way as would be the case with a high reduction ratio. In this way, very low reduction ratios can be employed and still result in a high quality bond, which is not otherwise possible without the grooves.

Figure 3:
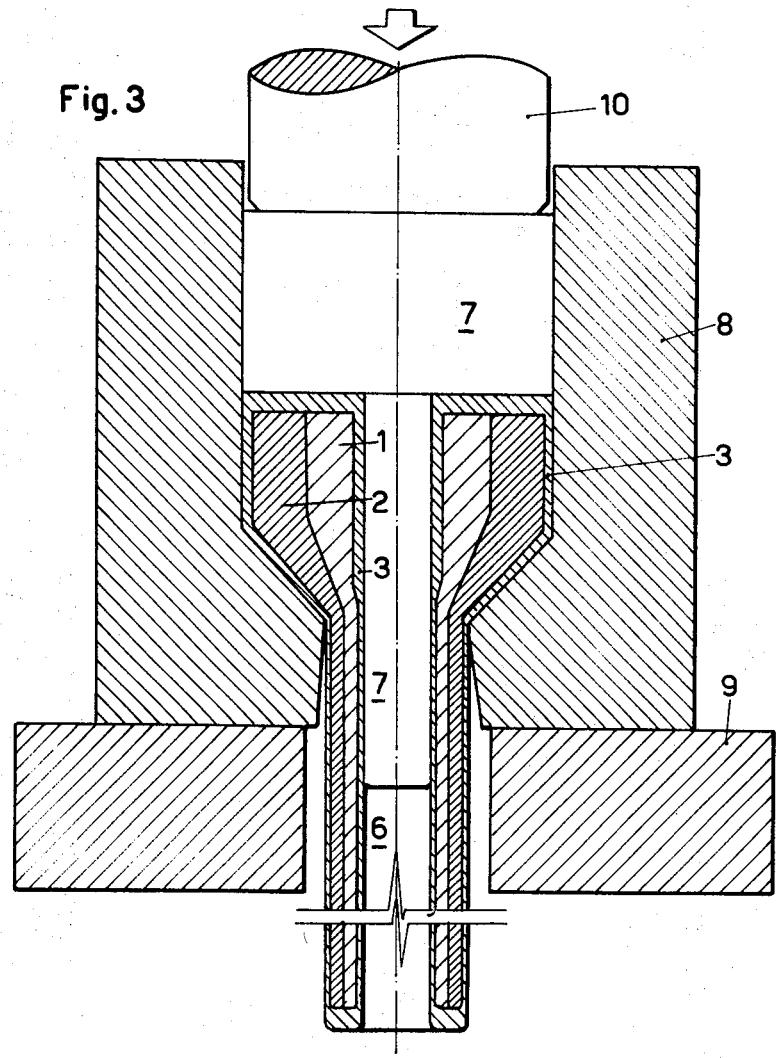
FIG. 3 illustrates an intermediate step of the extrusion operation of the billet of FIG. 1, whereby an extruded tube is obtained.
Figure 4:
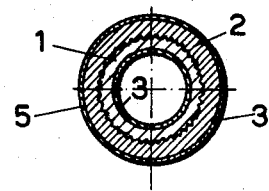
FIG. 4 is a cross section of the extruded tube obtained through the operation of FIG. 3.

The billet is then heated for a certain number of hours and maintained within a range of temperature which, in the present case, is from 800° C. to 900° C. and is subsequently extruded as shown in FIG. 3 to yield the composite tube 6 shown in transverse cross section in FIG. 4 which indicates also the penetrating effect of ridges 5.

A conventional metal extrusion press is employed, of which in FIG. 3 only the mandrel 7, the container-die 8, the container-die support 9, and the ram 10, are shown. The arrow indicates the direction of ram travel.

It is essential that the tubular component having the greater coefficient of thermal expansion be placed outside of the other one. In this way the effect of the temperature following the extrusion process will cause the outside component (stainless steel) to shrink onto the inner component (zirconium) during cooling, thereby placing the bond zone in compression; if the components were arranged otherwise, tensile forces would occur at the bond zone inducing cracks because the inner component would be shrinking away from the outer shell.

Figure 5:
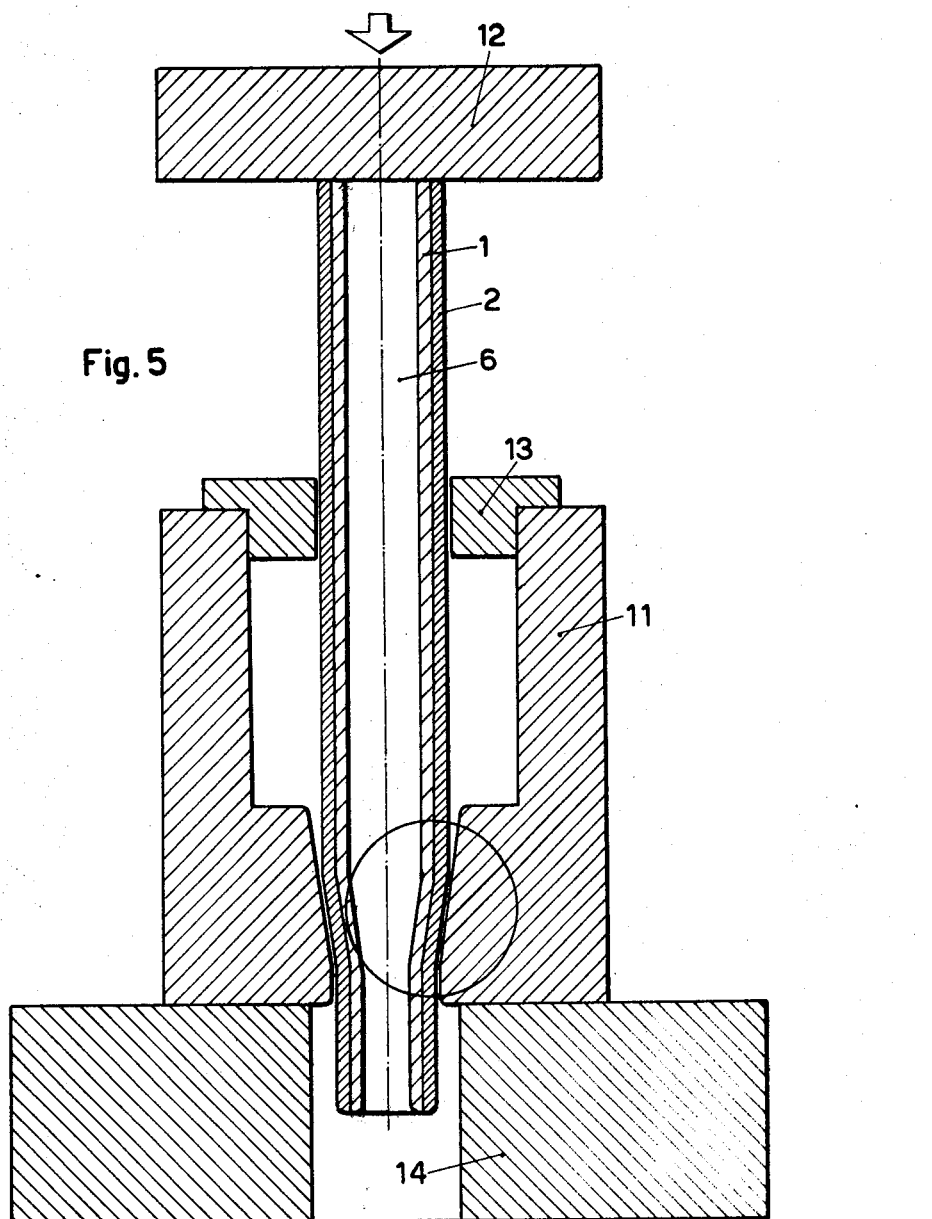

In the forming step illustrated in FIG. 5 extruded tube 6 is formed at one of its ends in such a manner that this new outer diameter is about equal to the bond zone diameter of the original tube.

Figure 6:
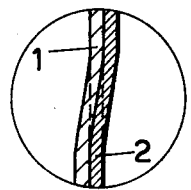

In other words, as shown in FIG. 6, as a consequence of this forming operation, that length of the tube corresponding to the end section to be made for example of stainless steel undergoes a reduction of its outer diameter approximately equal to twice the thickness of the stainless steel layer.

With further reference to FIG. 5, one of the preferred techniques for the above-mentioned forming operation consists in forcing the extruded tube 6 in the direction indicated by the arrow partially through a die 11 of suitable size by means of a piston 12. The extrusion 6 is centered by means of a ring 13 and the die 11 is supported by a die bearer 14. However, other techniques can be used for this forming operation, such as the swagging, interrupted drawing, or interrupted extrusion and the like.

The slope of the forming die 11 conforms to the programmed slope of the conical bonded surface desired in the joint. This forming operation is carried out in hot-working conditions after preheating the extruded tube 6 up to a temperature which, in the above-described case, is between 200° and 450° C.

When a pair of joints is to be made, one at each end of the tube 6, the second forming operation, is made by forcing in the direction of the arrow, the other end of the formed tube 6 of FIG. 5 into the same or another die as shown in FIG. 7, and forming this end in the same way. The predetermined distance between the two joints can readily and exactly be obtained by this method.

If a series of single joints of short lengths is desired, they can be obtained from a single long extruded tube by the forming of short cut sections, or by cutting double joints of appropriate lengths in half.

Figure 8:
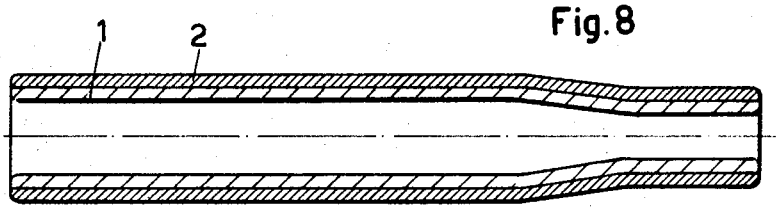
Figure 9:
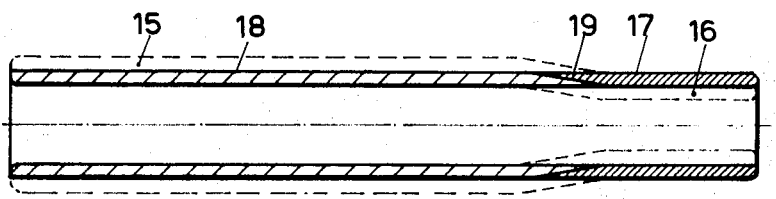

In the machining step of a single joint, with reference to FIGS. 8 and 9 the formed tube section is machined on a lathe so that certain portions of material are removed which are redundant with respect to the intended joint. This machining operation of the extruded and formed tube is carried out over the entire length of the tube section in such manner that the final inner diameter will correspond with or be in excess of the largest of two inside diameters of the tube sections as formed and the final outer diameter will correspond with or be less than the smaller of the two outside diameters of the tube as formed. In particular, parts 15 of stainless steel and 16 of zirconium are removed to leave parts 17 and 18 bonded in the region 19.

In the case of double joints, with reference to FIG. 10–11, machining operations are performed on the formed tube of FIG. 10 in such a way as to remove the superfluous metals shown by dotted lines in FIG. 11.

In this way, a double joint is made comprising end sections 17,17' of stainless steel and a central section 18 of zirconium, having removed the inner layer 16,16' of zirconium from the end sections, and the outer layer 15 of stainless steel from the central section of the extruded and formed tube. The bonded regions of the double joint are indicated as 19 and 19'.

With reference to FIG. 12 the double joint illustrates the characteristic line of junction 20 and 20' due to the use of the longitudinal ridges.

By a further variant in the case of very long double joint the amount of costly metal (in this case stainless steel) can be reduced by substituting a cheaper material such as soft iron in the portion of the original billet (FIG. 1) which will become item 15 in FIG. 11. Costs can be further reduced by removing portion 15 chemically instead of by machining.

A further illustration of the quantitative aspects of the process relating to this invention become apparent from the following nonlimitative examples of which two are described in detail, and the others are condensed in table 1.

By these means, after the machining operation as per FIG. 11, a double joint was obtained at the two ends of the tube which was therefore composed of three sections made respectively of 304 L stainless steel, Zircaloy-2 and stainless steel. This double joint, after being tested successfully for vacuum tightness with a helium leak detector, was subjected to a series of 20 temperature cycles from the ambient temperature up to 300° C. under vacuum. When subsequently subjected to a vacuum tightness test, the result of the test was positive.

Referring to table I it contains some more examples of joints obtained from various other extrusions, these joints having been subjected to the same tests as mentioned in examples 1 and 2.

TABLE 1.—TENSILE STRESS TESTS ON DIFFERENT TYPES OF JOINTS

| Reference number of extrusion | Steel designation | Billet temp., °C. | Reduction ratio | Diameter of the joint (mm.) | | Ultimate tensile stress (kg./sq. mm.) |
|---|---|---|---|---|---|---|
| | | | | Ins. | Out | |
| S 2-7 | 304 | 900 | 3.6 | 34.2 | 38.0 | [1] 46.28 |
| | | | | | | [1] 50.64 |
| S 2-14 | 304 | 900 | 3.6 | 34.5 | 38.0 | [1] 48.92 |
| | | | | | | [1] 45.16 |
| | | | | 34.5 | 38.0 | [1] 49.7 |
| | | | | | | [1] 54.2 |
| | | | | | | [1] 47.2 |
| S 1-18 | 304 | 900 | 3.6 | 34.3 | 38.6 | [1] 51.7 |
| | | | | 33.4 | 37.8 | [1] 44.7 |
| S 2-29 | 304 | 850 | 3.7 | 24.3 | 28.3 | [1] 36.2 |
| | | | | 27.5 | 24 | [1] 44.7 |
| S 1-42 | 304L | 900 | 3.1 | 34.3 | 36.7 | [1] 49.9 |
| | | | | | | [1] 49.9 |
| | | | | | | [1] 49.9 |
| | | | | | | [1] 49.6 |
| S 1-43 | 304L | 900 | 2.5 | 44.0 | 46.0 | [1] 50.2 |
| | | | | | | [1] 47.7 |
| | | | | | | [1] 38.1 |
| EI-45 | 304L | 900 | 3.6 | 51.8 | 54.3 | [1] 66.1 |
| | | | | | | [1] 66.0 |
| | | | | | | [1] 65.9 |
| | | | | | | [1] 62.5 |

[1] Failure of sample occurred in the Zircaloy; the joint area remained unaltered.

EXAMPLE 1

This example is related to a cylindrical billet with a circular ring cross section having outer and inner diameters of 79 mm. and 39 mm. respectively. The two coaxial tubular components of the billet, both being cylindrically symmetrical and having substantially the same length, were placed one inside the other; the outer one being made of 304 L stainless steel with longitudinal grooves of the shape shown in FIG. 2, item 5, 1,9 mm. high; and the inner one being made of Zircaloy-2; the thickness of the walls of said sleeves being the same, the whole billet was enclosed in a vacuumtight case of toroidal form made of malleable iron and thereafter evacuated to a pressure of less than $10^{13}$ torr.

Before placing them into the vacuumtight case the stainless steel sleeve and the case were degassed and degreased. The Zircaloy-2 sleeve was chemically cleaned.

After heating the billet for 2 hours at 900° C. in a furnace, it was then extruded by the means illustrated in FIG. 3 with an advancing speed of the ram 10 equal to 0,42 meters per minute.

The additional conditions of the extrusion operation were as follows:

The reduction ratio of the cross section areas of the billet components before and after the extrusion was 3 to 1. The extruded tube measured 49 mm. outside diameter and 32,5 mm. inside diameter.

The time period from the moment when the billet was taken out of the heating furnace to the moment when the extruding ram 10 began to move was 8 seconds.

The working pressure of the press was 150 kg./cm² and was maintained constant during the whole extrusion operation.

The ends of the extruded tube were cut off at right angles to the tube axis in order to obtain two end cross sections which, when polished, clearly showed the bond zone of the two metallurgically bonded components. Tests proved the high quality of the bond.

EXAMPLE 2

A billet identical to that described in example 1 was extruded as above, and the extruded tube was formed at both ends according to the procedure already described.

The tensile tests have been performed at room temperature. In all the examples cited, the extruded tubes were cooled in air, and the extrusion speed was the same as in Example 1.

A set of tests conducted for the purpose of verifying the reproducibility of the results so obtained confirmed that the method of joint production here involved was perfectly reliable.

We claim:

1. A process for producing a tube made of two or more joined sections of two different metals having reciprocal metallurgical affinity, each section being made of a metal different from the adjoining sections, comprising the following steps:

a. preparing two cylindrical hollow blocks of substantially the same length each made of one of said metals, and a casing made of a malleable metal, the inner diameter of one of said blocks being substantially equal to the outer diameter of the other block so that the blocks can be fitted one into the other;
  b. degassing and cleaning said blocks and casing;
  c. fitting said blocks one into the other to form a billet;
  d. enclosing said billet in said casing, producing a vacuum therein and sealing it vacuumtight;
  e. bringing said billet and casing at a plastic state by heating;
  f. extruding said billet to obtain a tube the wall of which is made of two layers of different metals, said layers being bonded together by a metallurgical bond, said tube being enclosed in a metal envelope obtained from said casing as a consequence of the extrusion;
  g. hot forming said tube to obtain a neck which is a gradual constriction of the tube symmetrical about its longitudinal axis,—or two necks at those locations along the tube where a transition joint is to be obtained in said metals, the longitudinal profile of said neck or necks being such that after the hot-forming operation the outer layer of the tube is brought in alignment with the inner layer, so that the length of the tube downstream of the neck up to the end of the tube has a constant cross section the outer diameter of which is equal to the outer diameter of the inner layer upstream of the neck;

h. removing all that portion of the outer layer which exceeds the outer diameter of the inner layer upstream of the necks along that section of the tube which remained unchanged after the hot-forming step; and i. removing all those portions of the inner layer which inwardly exceed the inner diameter of the outer layer downstream of the necks.

2. A process according to claim 1 wherein step (*a*) also comprises forming a plurality of longitudinal wedgelike projections on that surface of the harder metal block which is intended to engage the corresponding surface of the other block after the two blocks are fitted one into the other.

3. A process according to claim 1 wherein step (*a*) also comprises forming a plurality of wedgelike projections on those respective surfaces of the two blocks which reciprocally engage after the two blocks are fitted on into other.

4. A process according to claim 1 wherein said casing has the geometrical form of a cylindrical hollow tore.

5. A process according to claim 1 wherein the portions of the outer and inner layer to be removed according to steps (*h*) and (*i*) are removed by machining.

6. A process according to claim 1 wherein the portions of the outer and inner layer to be removed according to steps (*h*) and (*i*) are removed by chemical action.

7. A process as per claim 1 wherein the metals to be joined to form a tube consisting of adjoining sections of different metals are zirconium or its alloys and iron or its alloys.

8. A process for producing a tube made of two or more joined sections of two different metals having reciprocal metallurgical affinity, each section being made of a metal different from the adjoining sections, comprising the following steps:

a. preparing a first cylindrical hollow block made of one of said metals; a pair of cylindrical hollow blocks made of the other of said metals, the inner diameter of said pair of blocks being roughly equal to the outer diameter of said first block and an additional block with the same inner and outer diameter as said pair of blocks but made of a third metal different from them and from said first block, the total axial length of said pair of blocks and additional block being substantially equal to the length of said first block and a casing made of malleable metal for enclosing said blocks in a continuous envelope;

b. degreasing and cleaning said blocks and casing;

c. fitting said pair of blocks and additional block around said first block, the additional block being interposed between the two blocks of said pair so that a single block or billet is obtained;

d. enclosing said billet in said casing, producing a vacuum therein and sealing it vacuumtight;

e. bringing said billet and casing to a plastic state by heating;

f. extruding said billet to obtain a tube the wall of which is made of two continuous inner and outer layers, the inner one being made of one of said metals and the outer one being made of three contiguous sections of which two are made of the other of said metals and the third one which is intermediate to the outer two is made of a third metal different from both said metals, said layers being bonded together by a metallurgical bond; said tube being enclosed in a metal envelope obtained from said casing as a consequence of which extrusion;

g. hot forming said tube to obtain a neck which is a gradual constriction of the tube symmetrical about its longitudinal axis or two necks at those locations along the tube where a transition joint is to be obtained of said metals; the diameter of the tube cross section being left unchanged along that section of the tube where the outer layer is made of said third metal, the longitudinal profile of said neck or necks being such that after the hot-forming operation the outer layer of the tube is brought in alignment with the inner layer, so that the length of the tube downstream of the neck until the end of the tube has a constant cross section the outer diameter of which is equal to the outer diameter of the inner layer upstream of the neck;

h. removing all that portion of the outer layer which exceeds the outer diameter of the inner layer upstream of the necks that is along that section of the tube which remained unchanged after the hot-forming step; and i. removing all those portions of the inner layer which inwardly exceed the inner diameter of the outer layer downstream of the neck.

9. A process according to claim 8 wherein step (*a*) also comprises forming a plurality of longitudinal wedgelike projections on that surface of the harder metal block or blocks which are intended for engaging the corresponding surfaces of the other blocks after the blocks are assembled together to form a billet.

10. A process according to claim 8, wherein step (*a*) also comprises forming a plurality of wedgelike projections on those surfaces of the blocks which are intended to reciprocally engage after the blocks are assembled together to form a billet.

11. A process according to claim 8, wherein said casing has the geometrical form of a cylindrical hollow tore.

12. A process according to claim 8, wherein the portions of the outer and inner layer to be removed according to steps (*h*) and (*i*) are removed by machining.

13. A process according to claim 8 in which the portions of the outer and inner layer to be removed according to steps (*h*) and (*i*) are removed by chemical action.

14. A process according to claim 8 in which the metals to be joined to form a tube consisting of adjoining sections of different metals are zirconium or its alloys and iron or its alloys.